Aug. 27, 1957 M. W. BREGMAN 2,804,587
DIRECT CURRENT MOTOR PROTECTIVE DEVICE
Filed Nov. 29, 1954 2 Sheets-Sheet 1
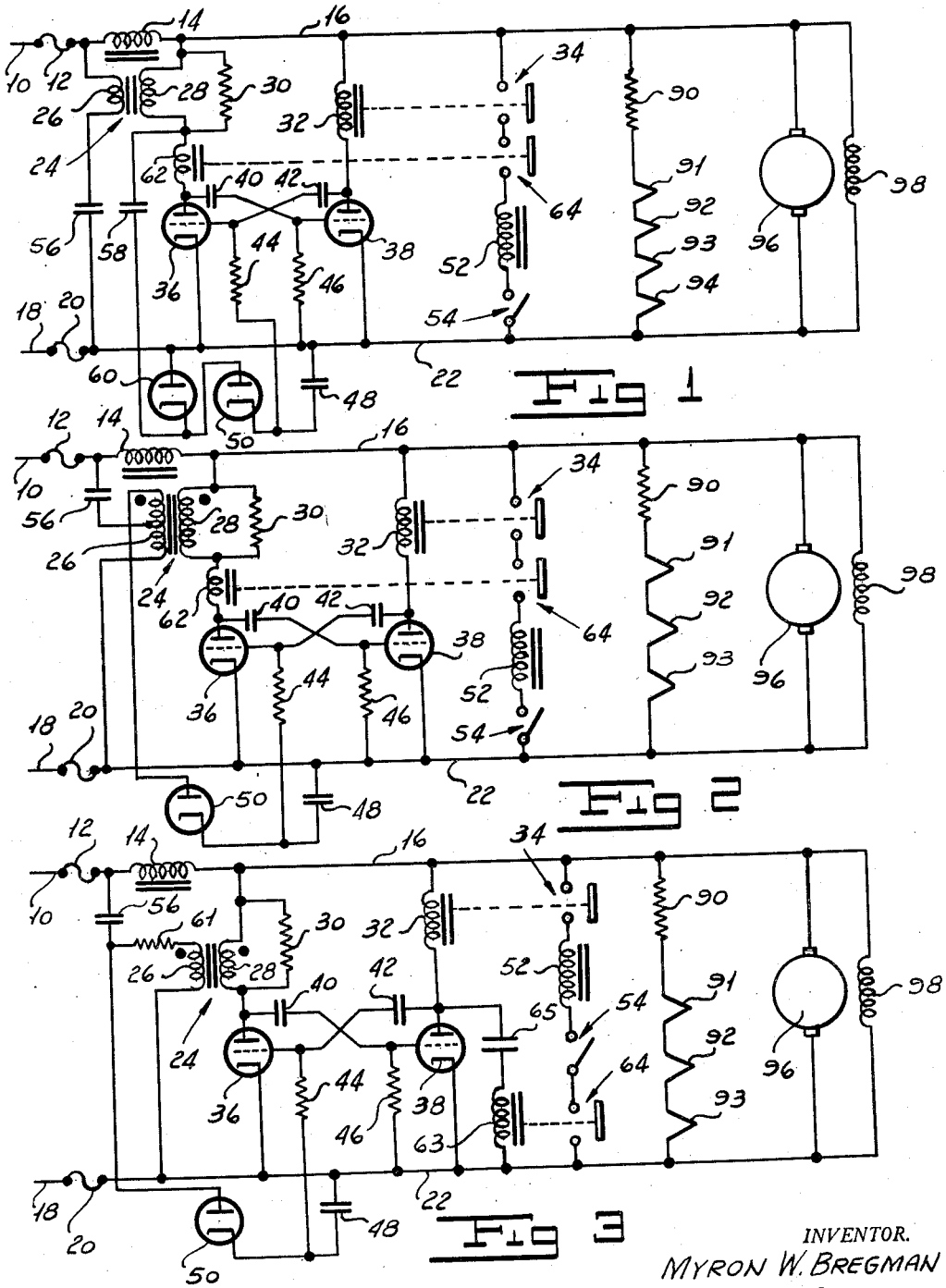
INVENTOR.
MYRON W. BREGMAN
BY Henry L. Shenier
ATTORNEY

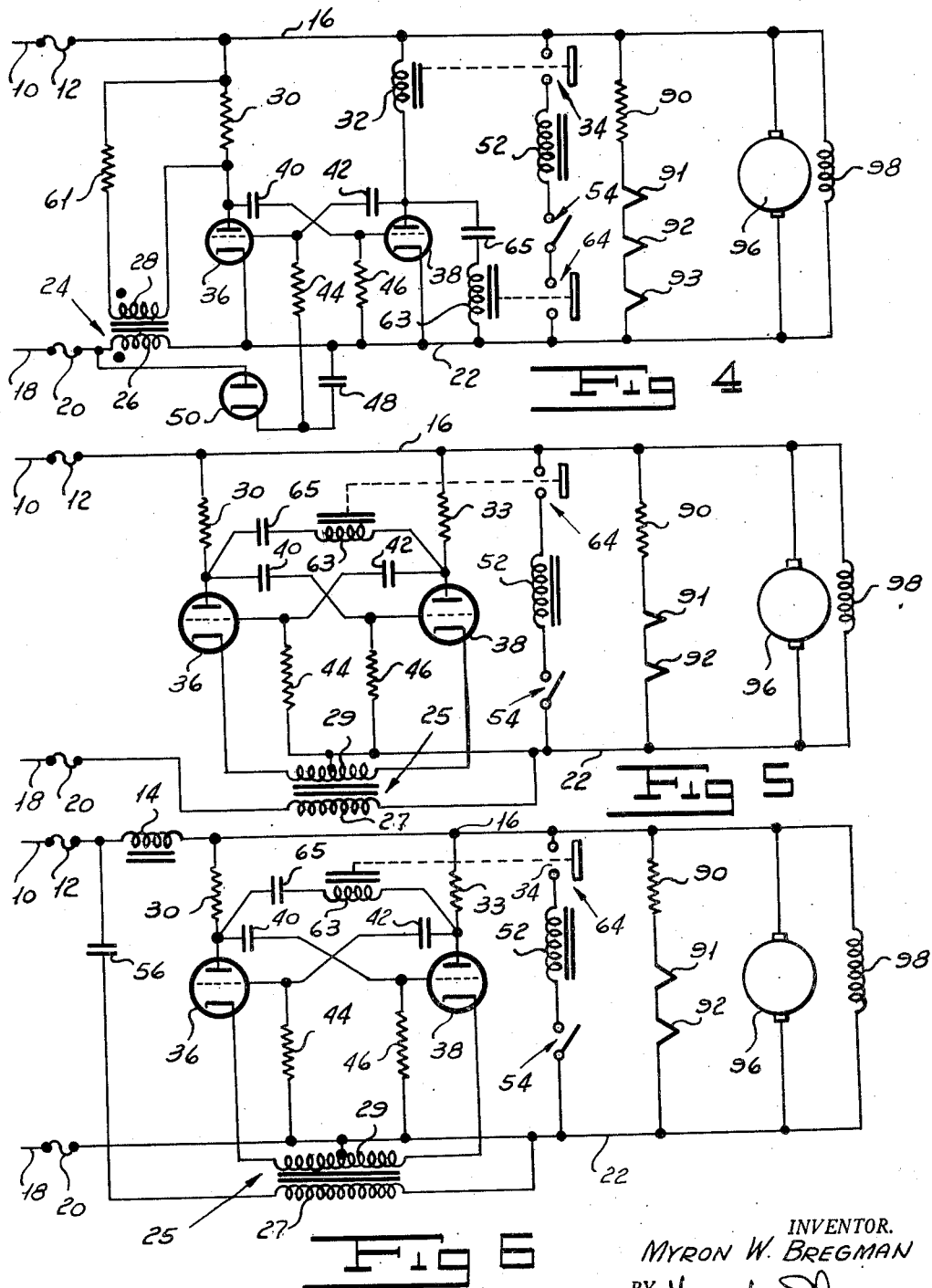

United States Patent Office 2,804,587
Patented Aug. 27, 1957

2,804,587

DIRECT CURRENT MOTOR PROTECTIVE DEVICE

Myron W. Bregman, Bronx, N. Y., assignor to Watson Elevator Company, Inc., New York, N. Y., a corporation of New York Application November 29, 1954, Serial No. 471,648

11 Claims. (Cl. 318—445)

My invention relates to a protective device for direct current elevators and more particularly to a device which will immediately and automatically set the drive motor brake and bring the elevator car to a stop in the event of an open circuit in the power mains.

It is customary to counterweight an elevator car for some assumed average value of car load to reduce the required capacity of the drive motor and drive motor brake. If the actual car load is equal to the assumed value for which the car is counter-weighted, the system will be exactly balanced. However, such a fortunate occurrence is extremely rare, and the system will usually be unbalanced. As often as not depending upon the car load and upon the direction of travel, the system will overhaul the drive motor; that is, the drive motor will be driven as a generator and will act as a dynamic brake, preventing the car speed from increasing. The drive motor brake is held released against the action of springs which would normally set the brake by a coil energized from the power lines. If with such an overhauling car load the power lines were to become open circuited due to, for example, the blowing out of a fuse, the dynamic braking action would be lost, and the elevator car would run away. The brake must be immediately set or the speed of the system may become so high as to exceed the capacity of the brake. If when the fuse blows out the speed of the system is sufficient, the voltage generated by the drive motor will keep the brake coil energized, and the brake will not be immediately set.

It is well known that the direct current power mains including the fuses may be used to conduct also a high frequency alternating current impressed thereon by an auxiliary oscillator; and that by particular circuitry, which may include frequency selective electric wave filters, this impressed alternating current may be made to operate a relay to set the brake. The blowing out of a fuse changes the electrical characteristics of the circuit and its response to the impressed alternating current. The use of an auxiliary oscillator increases the complexity with the concomitant likelihood of trouble due to component ageing or failure. It is also well known that this change in circuit characteristics may be used to reduce the loading on an oscillator circuit, which is normally nonoscillating due to excessive damping, thereby causing oscillations to build up, and using the negative bias developed to cut off an auxiliary normally conducting tube having the relay in the place circuit. The difficulty here is that if, due to tube ageing or tube failure, the gain of the oscillator tube is reduced, oscillations can never build up despite the blowing out of a fuse; consequently, the brake will not be set and the system may run away, out of control. In this case the device does not "fail safe."

My protective circuit need not employ auxiliary equipment such as devices of the prior art. My device is foolproof, since failure of components causes it to fail safe. I have invented a device which immediately de-energizes the brake coil and thereby sets the drive motor brake if a fuse in the power mains were to blow out.

One object of my invention is to provide a protective device which will immediately and automatically set the drive motor brake by deenergizing the brake coil if the power mains become open-circuited.

Another object of my invention is to provide a protective device which is foolproof and fails safe.

A further object of my invention is to provide a protective device which need not employ auxiliary equipment but which instead is entirely self-contained.

Other and further objects of my invention will appear from the following description.

In general, my invention contemplates the provision of a free-running, plate-coupled multivibrator. A relay in the plate circuit of one tube controls the current through the brake coil, which sets the brake upon interruption of the current. I inductively couple a change in impedance, occasioned by the blowing out of a fuse in the power mains, to my multivibrator circuit so as to change the mode of operation thereof and thereby control the relay. In one form of my invention the change of impedance is coupled into the plate circuit of one tube and the mode of operation of my multivibrator is changed so as to invert the assymetrical duty cycle to control a direct current relay. In another form of my invention the change of impedance is coupled into the cathode circuits of the tubes, causing sufficient degeneration to change the mode of operation of my multivibrator so as to make it rest quiescent and thereby de-energize an alternating current relay.

In the accompanying drawings which form part of the instant specification and which are to be read in conjunction therewith and in which like reference numerals are used to indicate like parts in the various views:

Figure 1 is a schematic diagram of one embodiment of the first form of my invention.

Figure 2 is a schematic diagram of another embodiment of the first form of my device.

Figure 3 is a schematic diagram of still another embodiment of the first form of my circuitry.

Figure 4 is a schematic diagram of a further embodiment of the first form of my protective circuit.

Figure 5 is a schematic diagram of one embodiment of the second form of my invention.

Figure 6 is a schematic diagram of another embodiment of the second form of my invention.

More particularly referring now to the drawings, positive power main 10 and negative power main 18 are energized from a direct current source (not shown), such as a direct current generator. Main 10 is serially connected by first a fuse 12 and secondly an inductor or choke coil 14 to line 16. Main 18 is connected by a fuse 20 to line 22. Lines 16 and 22 supply the power for both the drive motor, having armature 96 and field winding 98, and my protective circuitry. The junction of fuse 12 and choke 14 is serially connected by first a secondary or sensing winding 26 of a sensing transformer, indicated generally by the reference numeral 24, and second a blocking capacitor 56 to line 22. The cathodes of two multivibrator triodes 36 and 38 are directly connected to line 22. The plate circuit of tube 38 includes only brake setting relay coil 32 connected between line 16 and the plate of tube 38. Line 16 is connected by first a plate resistor 30, which is shunted by the primary winding 28 of sensing transformer 24, and then serially by a safety relay coil 62 to the plate of tube 36. The plate coupling includes coupling capacitor 40 connected from the plate of tube 36 to the grid of tube 38 and coupling capacitor 42 connected from the plate of tube 38 to the grid of tube 36. A grid resistor 46 is connected between the grid of tube 38 and line 22 to provide a direct current return path. A grid resistor 44 is, however, connected from the grid of tube 36 to a junction of the cathode of a half-wave, rectifying filter diode 50 and one terminal of a filter capacitor 48, the other terminal of which is connected to line 22. The voltage at the junction of plate resistor 30 and safety relay coil 62 is applied through a blocking capacitor 58 to both the cathode of a clamping diode 60, the plate of which is connected to line 22, and the plate of filter diode 50. A brake release coil 52 releases the brake upon the establishment of current and allows biasing springs to set the brake upon the interruption of current therethrough. The brake setting relay coil 32 controls contacts, indicated generally by the reference numeral 34. The safety relay coil 62 controls contacts, indicated generally by the reference numeral 64. A stop switch, indicated generally by the reference character 54, is operated in starting and stopping of the system. Stop switch 54 may be incorporated into the controller (not shown) which disconnects the armature from line 16 and 22 in stopping the system and interchanges the armature connections in reversing the motion of the system. Line 16 is connected serially first by contacts 34, secondly by contacts 64, thirdly by brake release coil 52, and finally by stop switch 54 to line 22. Line 16 is connected serially by a filament resistor 90 and sequentially by filaments 91, 92, 93, and 94, respectively, for tubes 36, 38, 50, and 60, to line 22. Plate resistor 30 may conveniently have a value equal to the resistance value of brake setting relay coil 32. Safety relay coil 62 has a much smaller resistance value than that of plate resistor 30. Grid resistors 44 and 46 conveniently have equal resistance values which in turn are much larger than those of plate resistor 30 and coil 32 so as to introduce negligible loading upon the plate circuits. Coupling capacitors 40 and 42 may conveniently have equal values. That is, the time constants of R-C combinations 44 and 42 and also 46 and 40 will conveniently be equal. I employ the change in impedance of a two branch parallel circuit to operate my device upon the blowing out of a fuse. With line fuses 12 and 20 intact, secondary sensing winding 26 of sensing transformer 24 will see, looking through the fuses, the essentially zero impedance of the direct current source. Looking away from the fuses toward the drive motor and protective circuit, it will see the high impedance offered by choke coil 14, at the operating frequency of the multivibrator, in series with an essentially zero impedance parallel combination of the multivibrator protective circuit generally, the brake release coil 52, the filament circuit, and the drive motor. Consequently, with the line fuses intact, the two branch parallel circuit has essentially zero impedance, which will be reflected by sensing transformer 24 into the primary winding 28, thereby short circuiting plate resistor 30. Since safety relay coil 62 has a small resistance value, the voltage swing at the plate of tube 36 will be relatively small. The negative swing at the grid of tube 38 will be correspondingly small, hence tube 38 will be cut off for a relatively short time. However, the voltage swing at the plate of tube 38 remains constant, and tube 36 is cut off for a relatively long time. In other words, in one cycle tube 38 conducts a far greater portion of the time than tube 36; that is, the duty cycle of tube 38 is heavy and sufficient current is passed through brake setting relay coil 32 to operate contacts 34. The voltage swing at the junction of plate resistor 30 and safety relay coil 62 is zero, and so also is the voltage swing at the plate of filter diode 50. The direct current grid return voltage for tube 36 at the junction of the cathode of filter diode 50 and one terminal of filter capacitor 48 will be that of line 22 for no voltage will exist across peak-value filter capacitor 48. Safety relay coil 62 conducts a sufficiently heavy current, despite the light duty cycle of tube 36, to close contacts 64. When it is desired to put the elevator car in motion, stop switch 54 is closed. Normally, then, there is a complete circuit for brake release coil 52 across lines 16 and 22 by means of contacts 34 and 64 and stop switch 54. Blocking capacitor 56 is selected so that its reactance at the fundamental frequency of the multivibrator when reflected into winding 28 is negligible compared with the resistance of safety relay coil 62. When either of fuses 12 or 20 is broken, the short circuiting of sensing winding 26 by the direct current source will no longer exist. Sensing winding 26 will now see substantially the impedance of choke coil 14 which is selected when reflected into winding 28 to be much larger than the resistance of plate resistor 30. The impedance reflected into primary winding 28 will now be so large that its shorting effect on plate resistor 30 will be negligible. If there were still no voltage across filter capacitor 48, the multivibrator would operate symmetrically, with both tubes 36 and 38 having equal duty cycles. However, there now exists a large voltage swing at the junction of plate resistor 30 and safety relay coil 62. There will, consequently, be a similar swing at the cathode of clamping tube 60, the negative peak of which will be clamped to the potential of line 22 and the positive peak of which will swing positive to line 22. The positive peak voltage at the cathode of clamping diode 60 is applied through rectifying diode 50 to charge filter capacitor 48 positively to the peak value of the voltage swing. Tube 36 will now be cut off a relatively short time because of the positive direct current grid return voltage existing across capacitor 48, which causes the exponential rise in voltage at the grid of tube 36 to intersect the cut-off voltage much sooner. The duty cycle of tube 38 will now be light and the duty cycle of tube 36 will now be heavy. Tube 38 draws a much smaller average current through brake setting relay coil 32 and contacts 34 will open, thereby interrupting the current through brake release coil 52 and setting the brake. The purpose of safety relay coil 62 is to ensure that my device will "fail safe." Assume that tube 36 were to fail. Tube 38 would always conduct maximum current, whether the fuse were blown or not. However, if tube 36 fails, no current will flow through safety relay coil 62. Consequently, contacts 64 will open, thereby setting the brake.

In Figure 2, I obtain the voltage swing to charge filter capacitor 48 from one terminal of the secondary sensing winding 26. By connecting the other terminal of the winding 26 directly to line 22, I provide a direct current path to charge filter capacitor 48 through filter rectifying diode 50, thereby eliminating blocking capacitor 58 and clamping diode 60 with associated filament 94. The junction of fuse 12 and choke 14 is connected by blocking capacitor 56 to a tap of secondary winding 26. In this case the polarity of the windings of sensing transformer 24 is important. When tube 36 conducts and a fuse is blown out, the terminal of primary winding 28 connected to relay 62 is negative with respect to the terminal connected to line 16. At this time I desire the terminal of secondary winding 26 connected to the plate of filter diode 50 to be positive with respect to the terminal connected to line 22. The operation of this circuit is identical in other respects to that of Figure 1.

In Figure 3, as in Figure 2, I charge filter capacitor 48 positively through filter diode 50 from the sensing winding 26, and eliminate blocking capacitor 58 and clamping diode 60 by connecting one terminal of winding 26 directly to line 22. However, in this case the charging is accomplished through a resistor 61 connected between the other terminal of secondary winding 26 and the plate of filter diode 50. Resistor 61 is selected so that, depending on the turns ratio of transformer 24, a resistance value approximately equal to that of coil 62 is reflected into the primary winding 28, which shunts resistor 30. Blocking capacitor 56 is connected from the junction of fuse 12 and choke 14 to the junction of resistor 61 and the plate of filter diode 50. Resistor 61 duplicates the electrical action of safety coil 62, which is eliminated, plate resistor 30 being connected to the plate of tube 36. A safety relay 63, controlling the normally open contacts, indicated generally by the reference character 64, is connected, by means of a series blocking capacitor 65, between the plate of tube 38 and line 22. The value of capacitor 65 may conveniently be chosen to resonate with the inductance of safety relay coil 63 at the frequency of operation of the multivibrator. Safety contacts 64, as before, control a series circuit through brake release coil 52. The operation in this instance is identical to that in Figures 1 and 2. As long as the circuit components are good, my circuit will act as a multivibrator energizing safety relay coil 63 and closing contacts 64 whether or not the duty cycle becomes inverted upon the blowing out of a fuse. But when my circuit no longer acts as a multivibrator, due to, for example, a tube failure, safety relay coil 63 is no longer energized, and safety contacts 64 open, causing the brake to be set.

In Figure 4 I employ a change in impedance of the series circuit including both fuses, the direct current source and the parallel combination comprising my multivibrator circuit generally, the brake release coil, the filament circuit, and the drive motor to initiate the action of my protective circuit. The secondary winding 26 is series-connected between fuse 20 and line 22, and is shunted by the essentially zero impedance of this series circuit. If either fuse were to open, the impedance of this series circuit becomes infinite. Since no choke coil is required, line 16 is connected to fuse 12. The plate voltage swing to charge filter capacitor 48 is obtained from that terminal of sensing winding 26 adjacent fuse 20 and is applied to the plate of filter diode 50. Resistor 61 in this case is placed in series with primary winding 28 and the combination shunts plate resistor 30.

The nature of operation of the circuits shown in Figures 1 through 4, inclusive, is identical. These circuits constitute one form of my invention. To summarize, the plate resistance of tube 36 is changed from a small to a large value by increasing the impedance reflected by sensing transformer 24 into the plate circuit when a fuse blows out. With the fuses intact, and the plate resistance of tube 36 small, the plate voltage swing is also small. Tube 38 is cut off for a short time. When the fuse 12 or the fuse 20 breaks, the plate voltage swing of tube 36 increases and is approximately equal to that of tube 38. Both tubes would then be cut off for substantially equal times and the duty cycles would be equal except for the fact that the increase in plate voltage swing of tube 36 is rectified by tube 50 and applied to filter capacitor 48 to raise the direct current grid return voltage of tube 36, thereby causing it to be cut off for a short period of time. Thus when a fuse blows, the duty cycles will be reversed and the frequency will remain substantially constant. The point from which is obtained the voltage swing to charge capacitor 48, when a fuse is blown out, has no voltage swing when the fuses are intact. Consequently, for normal operation no voltage exists across filter capacitor 48.

In Figure 5 I connect sensing winding 27, similar to winding 26, shown in Figure 4, between fuse 20 and line 22 to sense the condition of the fuses included in the series circuit outlined hereinabove in connection with winding 26 of Figure 4. Winding 27 is the secondary of a sensing transformer indicated generally by the reference numeral 25. The cathodes of tubes 36 and 38 are now connected, respectively, to the two terminals of a primary winding 29, center tapped to line 22, of sensing transformer 25, now in both the cathode circuits. Grid resistor 44 is returned directly to line 22, and filter capacitor 48 and filter diode 50 with filament 93 are eliminated. Resistor 61 is no longer needed. Brake setting relay coil 32 is replaced by its resistive equivalent, plate resistor 33, which may conveniently be of a value equal to that of plate resistor 30. Safety relay 63 and series resonant blocking capacitor 64 are now conveniently connected from plate to plate of tubes 36 and 38. When both fuses are intact, the essentially zero impedance, seen by sensing winding 26 in the series circuit including the two fuses, is reflected into primary winding 29, effectively short circuiting both cathodes to line 22. The circuit acts as a multivibrator having a symmetrical duty cycle. Safety relay 63 operates, closing contacts 64 and energizing brake release coil 52. If either fuse opens, secondary winding 27 sees infinite impedance, and the impedance in the cathode circuits of tubes 36 and 38 will be the high magnetizing impedance of sensing transformer 25. This high impedance in the cathode circuit of each tube causes degeneration, reducing the gain of each tube stage, and also causes negative feedback between the two tube stages by virtue of the coupling between cathodes provided by the center-tapped primary winding 29. If the cathode impedance is sufficiently large to reduce the loop gain below positive unity, my circuit will rest quiescent. Brake setting relay coil will not be energized and contacts 64 will open. By increasing the cathode impedance, not only may I reduce the loop gain below plus one, but I may also reduce it to zero and to, even further, a limiting negative value of minus one, as the impedance becomes infinite.

In Figure 6 I sense the condition of the fuses included in one branch of a two branch, parallel network, as explained in connection with Figures 1, 2, and 3. Choke coil 14 is reinserted between fuse 12 and line 16. Line 22 is connected to fuse 20. Sensing winding 27 is connected from line 22 through blocking capacitor 56 to the junction of fuse 12 and choke coil 14. The value of inductor 14 is made sufficiently large so that sufficient impedance is reflected into primary winding 29 to cause the multivibrator to rest quiescent over a wide band of frequencies about the normal operating frequency. At very low frequencies where the impedance of choke coil 14 is low, the attenuation in the high pass R-C filter combinations 46 and 40 and also 44 and 42 causes the circuit to rest quiescent. At those very high frequencies beyond resonance of inductor 14 with its own distributed stray capacitance, which should be small, the impedance seen by sensing winding 26 will decrease. Small capacitors (not shown) from the plate of each tube to line 22 to supplement the stray capacitances of the tubes will ensure that the gains of the tube stages will decrease due to increased plate loading before they increase due to a decrease in the cathode impedance. Figures 5 and 6 constitute a second embodiment of the invention. The operation in both cases is identical. If a tube fails, my multivibrator will come to rest, exactly as if a fuse had opened, and hence fails safe using only one relay in this embodiment.

It will be seen that I have accomplished the objects of my invention. My elevator protective device does immediately and automatically set the drive motor brake upon the open-circuiting of the power main by, for instance, the blowing out of a line fuse. I have provided an elevator protective device which upon the failure of a tube, the weak link in any electronic device, does fail safe. I have also provided an elevator protective device which is inherently self-contained and which need not employ auxiliary external equipment.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A protective multivibrator circuit including in combination a variable input impedance, two electronic space discharge tubes each having a plate and a cathode and at least one grid, a plate circuit for each of said tubes, a cathode circuit for each of said tubes, means for coupling said variable input impedance with one of said plate and cathode circuits of said two tubes whereby to change the condition of operation of the multivibrator circuit upon variation of said variable input impedance, and means including output means in the plate circuit of one of said tubes responsive to tube output, said output means being responsive to a change in the condition of operation of the multivibrator protective circuit.

2. A protective multivibrator circuit as in claim 1 in which said coupling means includes a transformer.

3. A protective multivibrator circuit as in claim 1 including a source of voltage, power mains, a fuse in the power mains, and a drive motor adapted to be energized from the power mains, in which said variable input impedance includes a two branch parallel network, one branch including said source of voltage and said fuse, and the second branch including said drive motor.

4. A protective multivibrator circuit as in claim 1 including a source of voltage, power mains, a fuse in the power mains, a drive motor adapted to be energized from the power mains, and an inductor in the power mains, in which said variable input impedance includes a two branch parallel network, one branch including said source of voltage and said fuse, and the second branch including said drive motor and said inductor.

5. A protective multivibrator circuit as in claim 1 including a source of voltage, power mains, a fuse in the power mains, and a drive motor adapted to be energized from the power mains, in which said coupling means includes a transformer having a winding in the power mains, and in which said variable input impedance includes a series circuit comprising said source of voltage and said fuse and said drive motor.

6. A protective multivibrator circuit as in claim 1 in which said variable input impedance is coupled with the plate circuit of one tube, and including means for obtaining a rectified and filtered output from the plate circuit of said one tube, whereby upon variation of said variable input impedance to substantially invert the asymmetrical duty cycle of the multivibrator circuit.

7. A protective multivibrator circuit as in claim 1 in which said variable input impedance is coupled with the cathode circuit of one tube, whereby upon variation of said variable input impedance to cause the multivibrator circuit to rest quiescent.

8. A protective multivibrator circuit as in claim 1 in which said output means includes a relay.

9. A protective multivibrator circuit as in claim 1 including a drive motor, a drive motor brake, a brake release coil, in which said output means includes a relay and said brake release coil.

10. A control circuit including in combination a source of electrical energy, a motor, a circuit including a brake release solenoid and a pair of normally open relay switches connected in series, a protective circuit including means for closing said normally open relay switches, means for connecting said motor and said brake release solenoid circuit and said protective circuit in parallel and means including circuit breaking means for connecting said parallel circuits to said source.

11. A control circuit as in claim 10 in which said protective circuit includes a pair of elements, means connecting said elements to operate as a multivibrator, said elements producing respective output signals, respective means responsive to said output signals for closing said normally open switches in one condition of operation of said multivibrator and means responsive to the operation of said circuit breaking means for changing the condition of operation of said multivibrator to permit one of said normally open switches to open.

References Cited in the file of this patent
UNITED STATES PATENTS

| | | |
|---|---|---|
| 2,545,690 | Giovanni | Mar. 20, 1951 |
| 2,557,843 | Schmidt | June 19, 1951 |